US009413465B2

(12) United States Patent  (10) Patent No.: US 9,413,465 B2
Tanaka  (45) Date of Patent: Aug. 9, 2016

(54) OPTICAL TRANSCEIVER AND OPTICAL OUTPUT LEVEL CONTROL METHOD

(71) Applicant: FUJITSU LIMITED, Kawasaki-shi, Kanagawa (JP)

(72) Inventor: Shinsuke Tanaka, Hiratsuka (JP)

(73) Assignee: FUJITSU LIMITED, Kawasaki (JP)

( * ) Notice: Subject to any disclaimer, the term of this patent is extended or adjusted under 35 U.S.C. 154(b) by 25 days.

(21) Appl. No.: 14/530,999

(22) Filed: Nov. 3, 2014

(65) Prior Publication Data

US 2015/0050020 A1    Feb. 19, 2015

Related U.S. Application Data

(63) Continuation of application No. PCT/JP2012/064210, filed on May 31, 2012.

(51) Int. Cl.
| | |
|---|---|
| H04J 14/02 | (2006.01) |
| H04B 10/50 | (2013.01) |
| H04B 10/40 | (2013.01) |
| H04J 14/06 | (2006.01) |

(52) U.S. Cl.
CPC .............. *H04B 10/40* (2013.01); *H04B 10/506* (2013.01); *H04J 14/0221* (2013.01); *H04J 14/0282* (2013.01); *H04J 14/06* (2013.01); *H04J 14/025* (2013.01); *H04J 14/0246* (2013.01)

(58) Field of Classification Search
CPC ... H04B 10/40; H04B 10/506; H04J 14/0221; H04J 14/06; H04J 14/0282; H04J 14/0246; H04J 14/025
USPC ...................................................... 398/90, 94
See application file for complete search history.

(56) References Cited

U.S. PATENT DOCUMENTS 5,225,922 A * 7/1993 Chraplyvy .......... H04J 14/0221
398/197
2003/0067649 A1   4/2003 Suzuki
(Continued)

FOREIGN PATENT DOCUMENTS

| JP | 2003-124893 A1 | 4/2003 |
| JP | 2003-124911 A1 | 4/2003 |

(Continued)

OTHER PUBLICATIONS

R. Nagarajan, et al.; "InP Photonic Integrated Circuits;" IEEE Journal of Selected Topics in Quantum Electronics; vol. 16; No. 5; Sep./Oct. 2010; pp. 1113-1125 (13 Sheets)/Page 4 of specification.

(Continued)

*Primary Examiner* — Leslie Pascal
(74) *Attorney, Agent, or Firm* — Kratz, Quintos & Hanson, LLP

(57) ABSTRACT

A receiving-side integrated optical circuit of an optical transceiver has an optical wavelength demultiplexer to separate signal light components of the different wavelengths contained in a wavelength division multiplexed signal received from each of N links of a transmission path, a set of N optical amplifiers inserted between the transmission path and the optical wavelength demultiplexer, each optical amplifier being configured to collectively amplify the signal light components of the different wavelengths contained in the received wavelength division multiplexed signal, and a set of photo detectors arranged after the optical wavelength demultiplexer and to detect the signal light components of the different wavelengths.

6 Claims, 11 Drawing Sheets

(56) References Cited

U.S. PATENT DOCUMENTS

| | | |
|---|---|---|
| 2003/0113053 A1 | 6/2003 | Kuramata |
| 2005/0135732 A1 | 6/2005 | Crow |
| 2010/0142958 A1 | 6/2010 | Matsumoto |

FOREIGN PATENT DOCUMENTS

| | | | |
|---|---|---|---|
| JP | 2003-185985 | A1 | 7/2003 |
| JP | 2003-207668 | A1 | 7/2003 |
| JP | 2005-182033 | A1 | 7/2005 |
| JP | 2010-136195 | A1 | 6/2010 |
| JP | 2010-154375 | A1 | 7/2010 |

OTHER PUBLICATIONS

International Search Report for International Application No. PCT/JP2012/064210 dated Jul. 17, 2012.

* cited by examiner

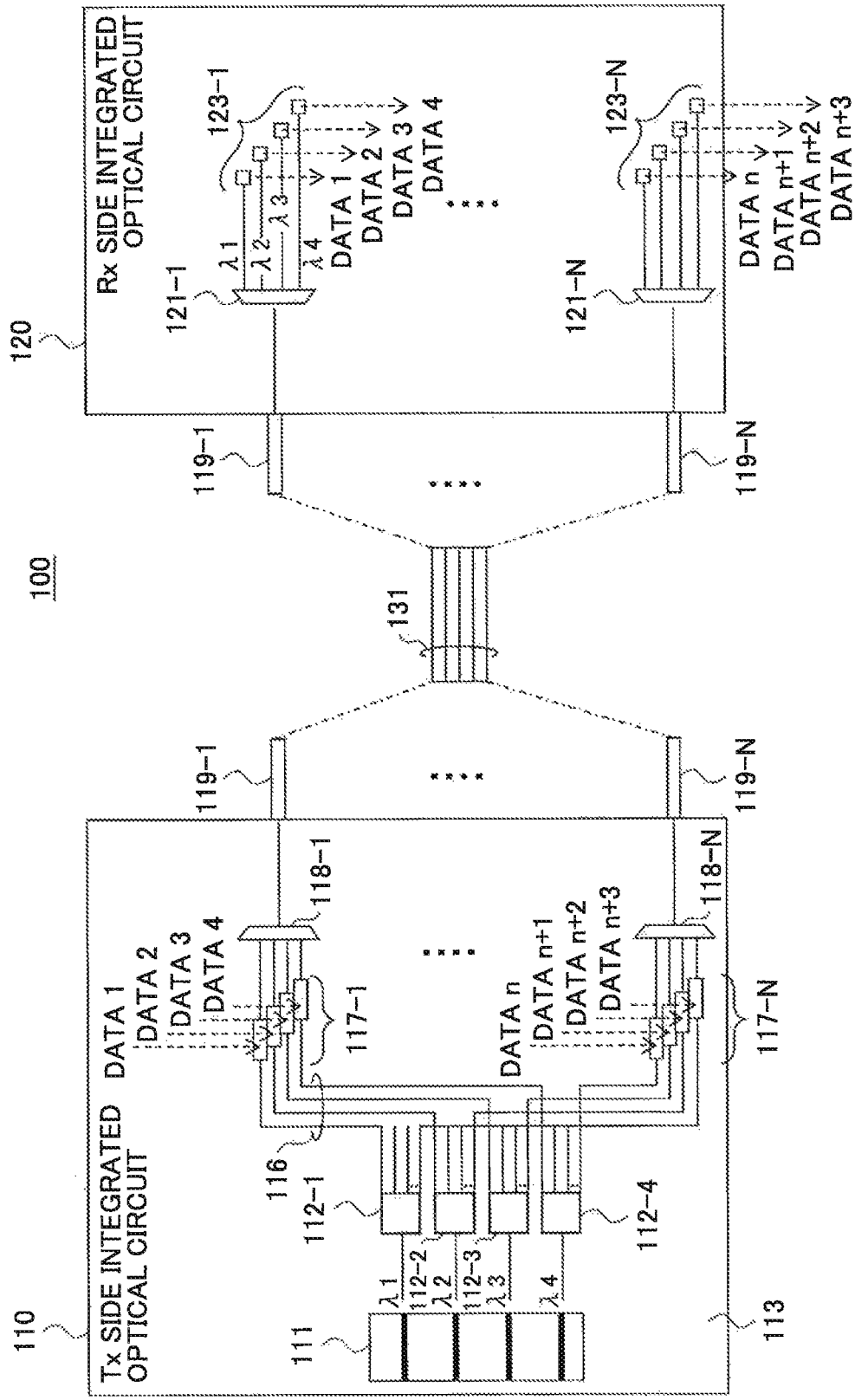

MINIMUM RECEIVE SENSITIVITY OF PD −10 dBm
POWER LOSS IN TRANSMISSION LINE 24.5 dB

LASER POWER CONSUMPTION FOR 384 LINKS
(AT LASER POWER CONVERSION EFFICIENCY OF 10%)

OPTICAL TRANSCEIVER AND OPTICAL OUTPUT LEVEL CONTROL METHOD

CROSS REFERENCE TO RELATED APPLICATIONS

This application is a continuation application filed under 35 U.S.C. 111(a) claiming benefit of priority of PCT International Application No. PCT/JP2012/064210 filed May 31, 2012 and designating the United States, which is incorporated herein by reference in its entirety.

FIELD

The embodiments discussed herein relate to an optical transceiver and an optical output level control method.

BACKGROUND

In recent years and continuing, integrated optical devices using silicon (Si) substrates are attracting attention. Optical devices using silicon substrates are fabricated at a low cost and monolithically mounted together with electronic circuits. Silicon is a medium transparent to an optical signal at 1.3 µm band or 1.55 µm band, which bands have been conventionally used in optical communication systems. Making use of semiconductor processes, low-loss and high-confinement silicon photonic waveguides can be fabricated. On the basis of such silicon photonic waveguides, a variety of optical devices are proposed and demonstrated.

In order to increase transmission capacity of silicon photonic integrated circuits, a wavelength-division multiplexing (WDM) based silicon photonic integrated circuit is a promising approach. WDM-based silicon photonic integrated circuits adopt a WDM transmission scheme used in fiber optic transmissions, and independently modulated optical signals with different wavelengths are multiplexed in a silicon device for transmission.

FIG. 1 illustrates a typical WDM-based optical transceiver 100. A transmission-side integrated optical circuit 110 and a receiving-side integrated optical circuit 120 are connected to each other with an N-fiber optic array 131. A 4-wavelength laser array 111, which serves as a WDM signal light source, is flip-chip mounted on a silicon substrate 113 in the transmission-side integrated optical circuit 110. Continuous-wave (CW) signal lights output from the respective channels of the 4-wavelength laser array ill are coupled to corresponding silicon photonic waveguides and guided to 1×N photo couplers 112-1 through 112-N. The signal light of each wavelength is equally split into N branches by the corresponding 1×N photo coupler 112. The light components split from the respective wavelengths are lined up in order of wavelength by branch-connection silicon waveguides 116, and modulated at an optical modulator array 117 under application of different data items depending on the wavelengths. The modulated signal lights are combined by an optical wavelength multiplexer (MUX) 113 into a single silicon photonic waveguide and input to an optical fiber 119 for transmission.

N sets of the above-described wavelength multiplexing mechanism are provided to the transmission-side integrated optical circuit 110 according to the number N of the divided branches. Each of the wavelength multiplexing mechanisms is optically connected, to a corresponding one of the optical fibers 119. The N-branch (or N-channel) signal lights are transmitted in parallel by N fiber optic array 131.

In the receiving-side integrated optical circuit 120, the WDM-based signal lights transmitted through the optical fibers 119-1 to 119-N are input to demultiplexers (DEMUX) 121-1 to 121-N, and separated into wavelength components. The separated wavelength components of each channel are output to different silicon photonic waveguides and converted into electric signals representing the transmitted data signals by an optical to electrical (O/E) converter that includes a photodetector array 123. N sets of the above-described separation/demodulation mechanism are provided in parallel in the receiving-side integrated optical circuit 120.

The total transmission capacity of the optical transceiver 100 is defined as D×N×M (Gb/s), wherein D denotes a modulation rate (Gb/s) of a modulators, N denotes the number of branches, and M denotes the number of wavelengths. In order to achieve a desired level of the total transmission capacity T (Gbs) using multiple WDM links, the number k of the laser arrays 111 (where k=T(N×M)) may be increased; however, the cost and the size also increase. If the number of laser arrays 111 is kept small, it is desired to increase the number N of the branches to supply as many signal lights as possible to the transmission paths from a single laser source. The minimum, sensitivity of a photo detector to the received light and the transmission loss of each link due to insertion of the optical modulator array 117, MUX 118 and DEMUX 121 are fixed in advance. Accordingly, in order to increase the number N of the branches for error-free transmission, the output level of the laser has to be increased to N times greater. In reality, the output power of currently available semiconductor laser sources is 10 mW to 100 mW and there is a limit to increasing the number of branches from the viewpoint of the laser output.

It is desired to provide an optical transceiver and an optical output level control technique that can reduce power consumption of the entirety of an optical transmission system. Meanwhile, a configuration of inserting a wideband semiconductor optical amplifier (SOA) before the demulplexing part in a receiving-side optical device is known. See, for example, Radhakrishnan Nagarajan, et al. "InP Photonic Integrated Circuits", IEEE Journal of Selected Topics in Quantum Electronics, Vol. 16, No. 5, September/October.

SUMMARY

According to an aspect of the embodiments, an optical transceiver comprises:
a transmission-side integrated optical circuit to output a wavelength division multiplexed signal with light components of different wavelengths combined therein to an N-link transmission path; and
a receiving-side integrated optical circuit to receive the wavelength division multiplexed signal from the transmission path,
wherein the transmission-side integrated optical circuit has a multi-wavelength light source, a photo coupler to split light of each wavelength output from the multi-wavelength light source into N branches, an optical modulator to modulate a group of light components split from the respective wavelengths by different data signals, and an optical wavelength multiplexer to multiplex the modulated light components of the different wavelengths into the wavelength division multiplexed signal, and
wherein the receiving-side integrated optical circuit has
an optical wavelength demultiplexer to separate signal light components of the different wavelengths from the received wavelength division multiplexed signal,
a set of N optical amplifiers inserted between the transmission path and the optical wavelength demultiplexer, each optical amplifier being configured to collectively amplify the signal light components of the different wavelengths contained in the wavelength division multiplexed signal received from a corresponding link of the transmission path, and a set of photo detectors arranged after the optical wavelength demultiplexer and to detect the signal light components of the different wavelengths.

According to another aspect of the embodiments, a method for controlling an output power level of a multi-wavelength light source used in a wavelength division multiplexing transmission system is provided. The method includes receiving from an optical link a wavelength division multiplexed signal in which signal lights with difference wavelengths are multiplexed;

amplifying the wavelength division multiplexed signal using an optical amplifier before wavelength separation is performed;

detecting an intensity of a separated signal light of each wavelength;

calculating an optical loss of the optical link based upon the intensity;

calculating and holding an optical gain of the optical amplifier as a function of the output power level, of the multi-wavelength light source based upon the optical loss of the optical link;

calculating and holding a first power consumption of the multi-wavelength light source and a second power consumption of the optical amplifier as a function of the output power level of the multi-wavelength light source based upon the output power level of the multi-wavelength light, source and the optical gain of the optical amplifier; and determining a new output power level of the multi-wavelength light source based upon a total power consumption of the first power consumption and the second power consumption.

The object and advantages of the invention will be realized and attained by means of the elements and, combinations particularly pointed out in the claims.

It is to be understood that both the foregoing general description and the following detailed description are exemplary and explanatory and are not restrictive to the invention as claimed.

BRIEF DESCRIPTION OF DRAWINGS

FIG. 1 is a schematic diagram of a typical WDM-based optical transceiver;

DESCRIPTION OF EMBODIMENTS

The inventor of the present application found the fact that even if the number of branches of light output from a laser source is increased, the total power consumption of the system does not change very much and little contribution is made to reduction, in power consumption. This is because the laser output level and power consumption of each laser source need to be increased when increasing the number of branches to expand transmission capacity, although the number of laser arrays is kept small.

Figure 2A:
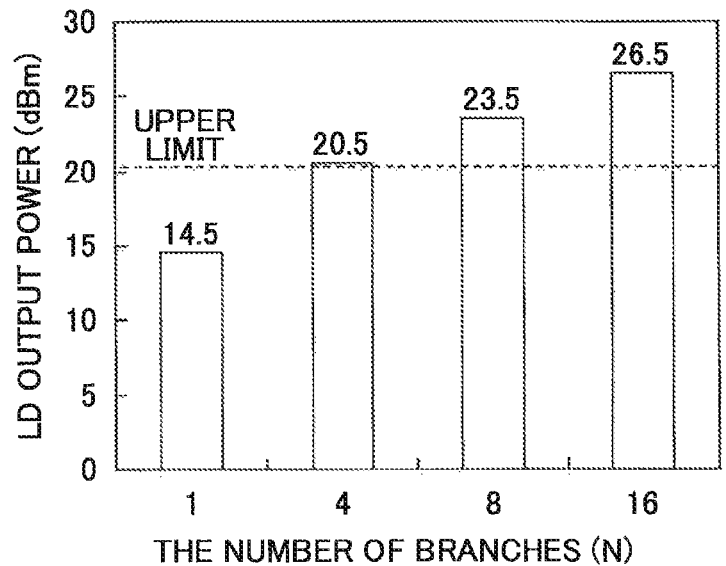
FIG. 2A illustrates a relationship between the number of branches of laser light and a laser output power level in the structure of FIG. 1.

FIG. 2A illustrates relationship between the number N of the branches and output power level required for a laser. FIG. 23 illustrates relationship between the number N of the branches and total power consumption. In FIG. 2A, the laser output power is calculated under the condition that the minimum receive sensitivity of the photo detector is −10 dBm and the total loss in the transmission path is constant at 24.5 dB, disregarding excess loss due to the branching. When the laser light is not split (i.e., the number of branches is one), the required laser output power is 14.5 dBm. As the number of branches increases, the output power level required for the laser increases. When the number of branches is four or more, the output power level required for the laser cannot be achieved by a realistic light source.

Figure 2B:
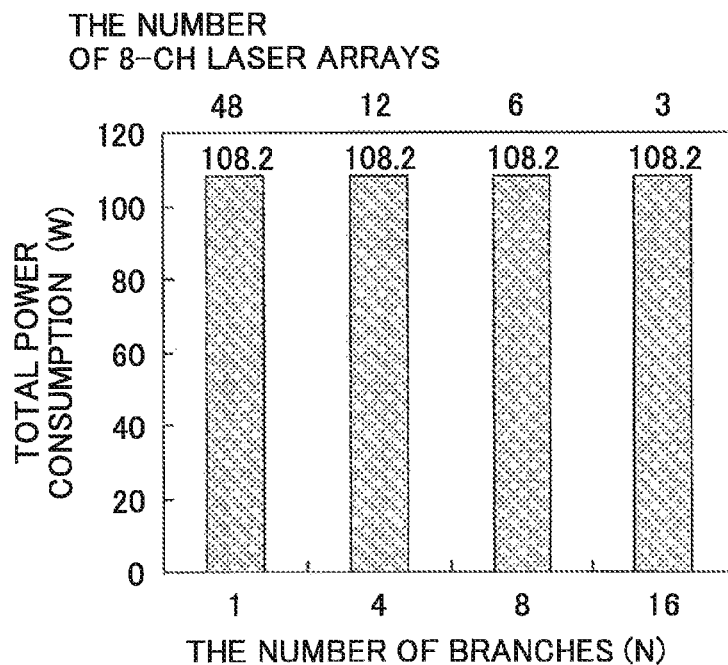
FIG. 2B illustrates relationship between the number of branches of laser light and a total power consumption of the structure of FIG. 1.

In FIG. 2B, total power consumption is calculated under the condition that the total number of links is 384 and the electrical-to-optical power conversion efficiency at the laser is 10%. Assuming that an 8-channel laser array is used, the number of arrays required decreases from 48 to 12, 6, and 3 as the number N of the branches increases; however, the total power consumption does not change. This is because the power consumption of each laser source increases.

From the above-describe simulation results, it is understood that, with a conventional. WDM-based silicon photonic integrated circuit, the number of branches is limited because if the number of branches for each laser source is increased in order to reduce the number of laser arrays, the required laser output power also increases. Another issue is that the total power consumption of the overall system cannot be reduced.

In the embodiments, the above-described issues are solved by inserting a semiconductor optical amplifier (SOA) preamplifier in the silicon photonic waveguide extending between the optical transmission path (such as an optical fiber) and an optical wavelength demultiplexer at a receiving end. In a receiving-side integrated optical circuit, a SOA preamplifier is arranged at a position where a WDM signal light is input from the transmission path. By amplifying the WDM signal light collectively before the wavelength separation is carried out, an optical gain is provided corresponding to the increase in the number of branches. With this arrangement, the laser output power can be maintained at or below a predetermined level on the transmitter side.

Figure 3:
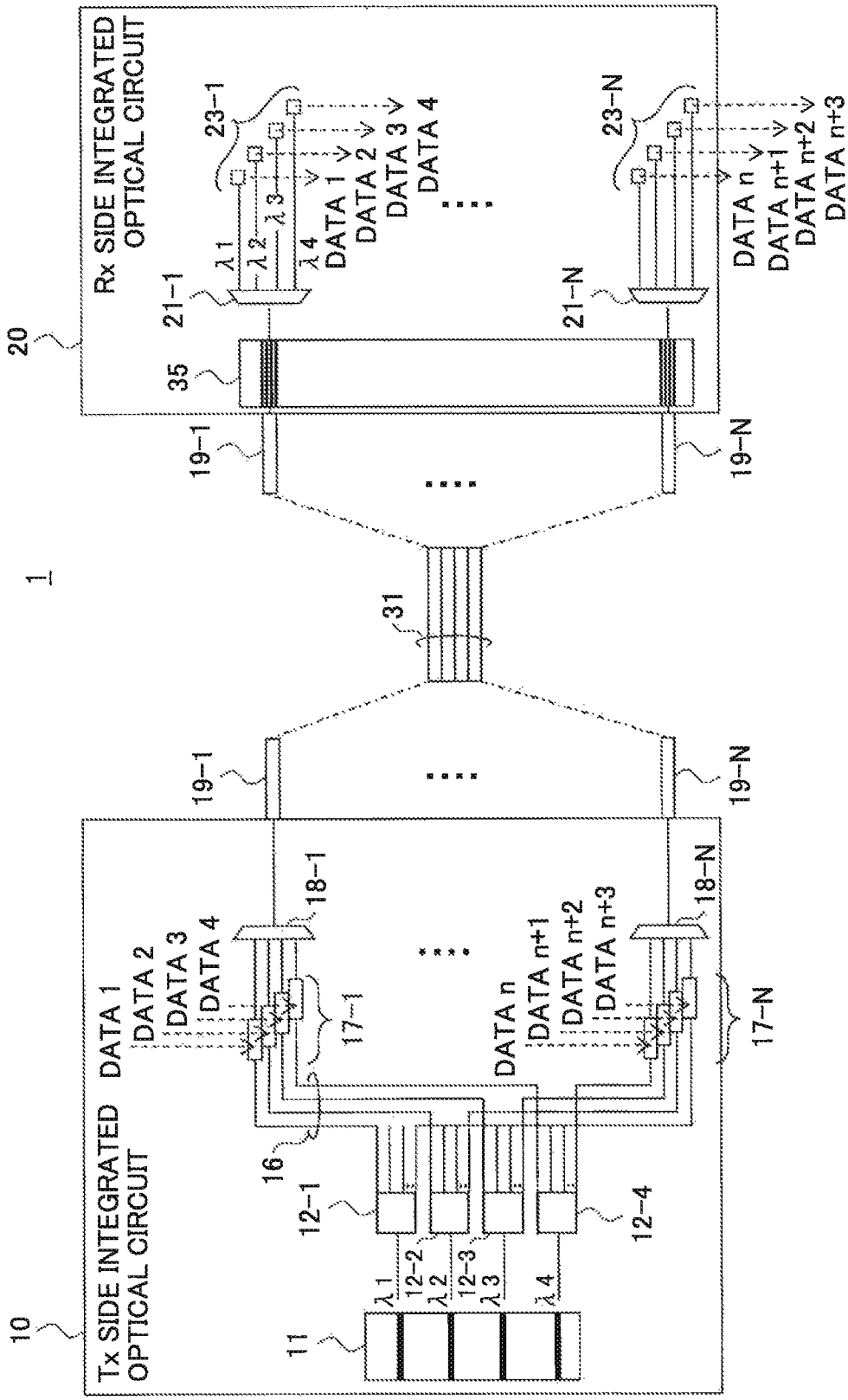
FIG. 3 is a schematic diagram of an optical transceiver according to the first embodiment.

FIG. 3 is a schematic diagram of an optical transceiver 1 according to the first embodiment. The optical transceiver 1 includes a transmission-side integrated optical circuit 10, a receiving-side integrated optical circuit 20, and an N-fiber optic array 31 in the transmission-side integrated optical circuit 10, a multi-wavelength laser array (e.g., 4-wavelength laser array) 11 which serves as an WDM signal light source is flip-chip mounted on a silicon substrate. The laser array 11 has semiconductor laser sources with different wavelengths ($\lambda 1$ to $\lambda 4$) integrated on a compound-semiconductor substrate (such as InP substrates).

The continuous wave (CW) signal lights output from the respective channels of the laser array 11 are coupled to silicon photonic waveguides and guided to 1×N photo couplers 12-1 to 12-4. Each of the signal lights is split equally into N branches by a corresponding one of the 1×N photo couplers 12-1 to 12-4. The light components split from the respective wavelengths are distributed in N groups, lined up in each group in order of wavelength ($\lambda 1, \lambda 2, \lambda 3,$ and $\lambda 4$), and modulated by optical modulator arrays 17-1 to 17-N with different data signals. The modulated signal lights are combined in a silicon photonic waveguide group by group using optical wavelength multiplexers (MUX) 18-1 to 18-N and input to corresponding optical fibers 19-1 to 19-N for transmission.

The receiving-side integrated optical circuit 20 has a SOA preamplifier array 35 at the receiving input. The SOA preamplifier array 35 has N SOA devices (not illustrated) corresponding to the N-channel optical signal received from the transmission path 31. Each of the SOA devices amplifies collectively the light components with wavelength of $\lambda 1, \lambda 2, \lambda 3,$ and $\lambda 4$ contained in the signal light received from the corresponding one of the optical fibers 19-1 to 19-N and provides an optical gain to the received multi-wavelength signal light. The amplified multi-wavelength signal light is split by a corresponding one of optical wavelength demultiplexers (DEMUX) 21-1 to 21-N into different silicon photonic waveguides according to the wavelength. The separated light components of the respective wavelengths are converted by an optical to electric converter having photo detectors 23-1 to 23-N into electric signals representing the transmitted data signals.

By providing optical gain to the received signal light at the WDM signal input end of the receiving side, the N-channel light signal can be received correctly without increasing the laser output power at the transmission side to compensate for the N branches. In addition, the total power consumption of the entirety of the optical transceiver 1 can be reduced as illustrated in FIG. 4A and FIG. 4B.

Figure 4A:
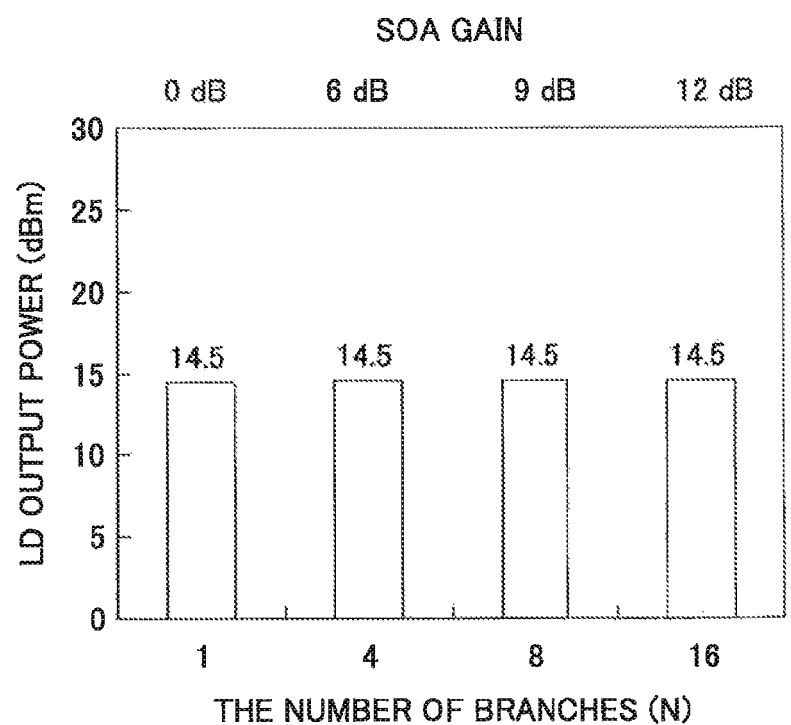
FIG. 4A illustrates a relationship between the number of branches of laser light and a laser output power level in the structure of FIG. 3.

FIG. 4A illustrates a relationship between the number of branches and required laser output power level in the structure of FIG. 3. FIG. 4B illustrates a relationship between the number of branches and total power consumption in the structure of FIG. 3. Similar to FIG. 2A, the laser output power level is calculated under the condition that the minimum receive sensitivity of the photo detector is −10 dBm and the total loss in the transmission path is constant at 24.5 dB, disregarding excess loss due to the branching.

In the simulation, the number of wavelengths of WDM is sixteen, and one SOA device is assigned to the 16-wavelength WDM signal at the SOA preamplifier array 35. When the number of branches of the laser output light is four, 6 dB optical gain is provided at the receiving input. When the number of branches is eight, 9 dB optical gain is provided at the receiving input. When the number of branches is sixteen, 12 dB optical gain is provided at the receiving input. As is seen from the simulation result of FIG. 4A, the burden of the transmission side due to increase in the number of branches is compensated for by the SOA gains at the receiving side, and the laser output power level is maintained constant even if the number of branches is increased.

Figure 4B:
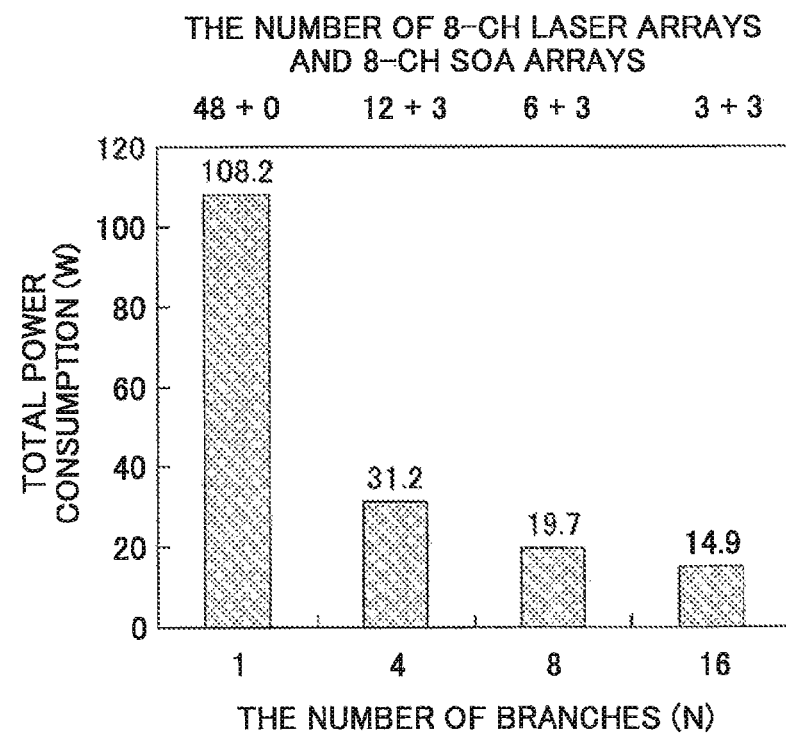
FIG. 4B illustrates a relationship between the number of branches of laser light and a total power consumption of the structure of FIG. 3.

FIG. 4B illustrates total power consumption, reduction effect. Similar to FIG. 2B, total power consumption of all the lasers is calculated under the condition that the number of links is 384 and the electrical-to-optical power conversion efficiency at the laser is 10%. Assuming that an 8-channel laser array is used, the number of arrays required for the all links decreases from 48 to 12, 6, and 3 as the number N of the branches increases from 1 (without branching) to 4, 8 and 16, as in FIG. 2A. A major difference is that the total power consumption is greatly reduced.

This is because the number of laser arrays is reduced while maintaining the constant output power level of light sources of each laser array 11. The power consumption of the SOA preamplifier array 35 of the receiving side is not so great, that is, 200 to 350 mW power is used for a 16-wavelength WDM in signal. It should be noted that the total power consumption of the SPA preamplifier hardly affected by the number of wavelengths. Thus, the above mentioned power consumption of the SOA can be shared by the multiple links having different wavelengths that composes WDM signal. Accordingly, the total power consumption can be reduced even if the SPA preamplifier array 35 is added to the receiving side. The power consumption reduction effect becomes greater as the number of branches increases. When the number of branches is sixteen, 13% reduction in power consumption can be achieved compared to the conventional, structure.

With the configuration of FIG. 3, although the number of devices mounted on the receiving side slightly increases by adding the SOA preamplifier array 35, only three SPA preamplifier arrays 35 are added regardless of the number of branches (N=4, 8, or 16) when using an 6-channel. SPA preamplifier array 35. This is calculated from (388 links)[(16 wavelengths)×(8 channels)], which equals three. When the number of branches is four (N=4), the number of transmission-side SOA laser arrays 11 is twelve, the number of receiving-side SPA preamplifier arrays 35 is three, and the total of 15 SOA arrays is used. When the number of branches is eight (N=8), the number of transmission-side SPA laser arrays 11 is six, the number of receiving-side SOA preamplifier arrays 35 is three, and the total of 9 SOA arrays is used. When the number of branches is sixteen (N=16), the number of transmission-side SCP laser arrays 11 is three, the number of receiving-side SOA preamplifier arrays 35 is three, and the total of 6 SOA arrays is used. Sven if some SOA preamplifier arrays 35 are added to the receiving side, the total number of laser and SOA arrays used in the entirety of the optical transceiver 1 can be efficiently reduced by increasing the number of branches.

In this manner, the need for increase in laser output power due to increase of the number of branches is compensated for by providing optical gain using the SOA preamplifier array 35 that collectively amplifies the WON signal containing light components of various wavelengths. This arrangement can prevent, the required laser output power from increasing and reduce the power consumption of the entirety of optical transmission and receiving apparatus.

Figure 5:
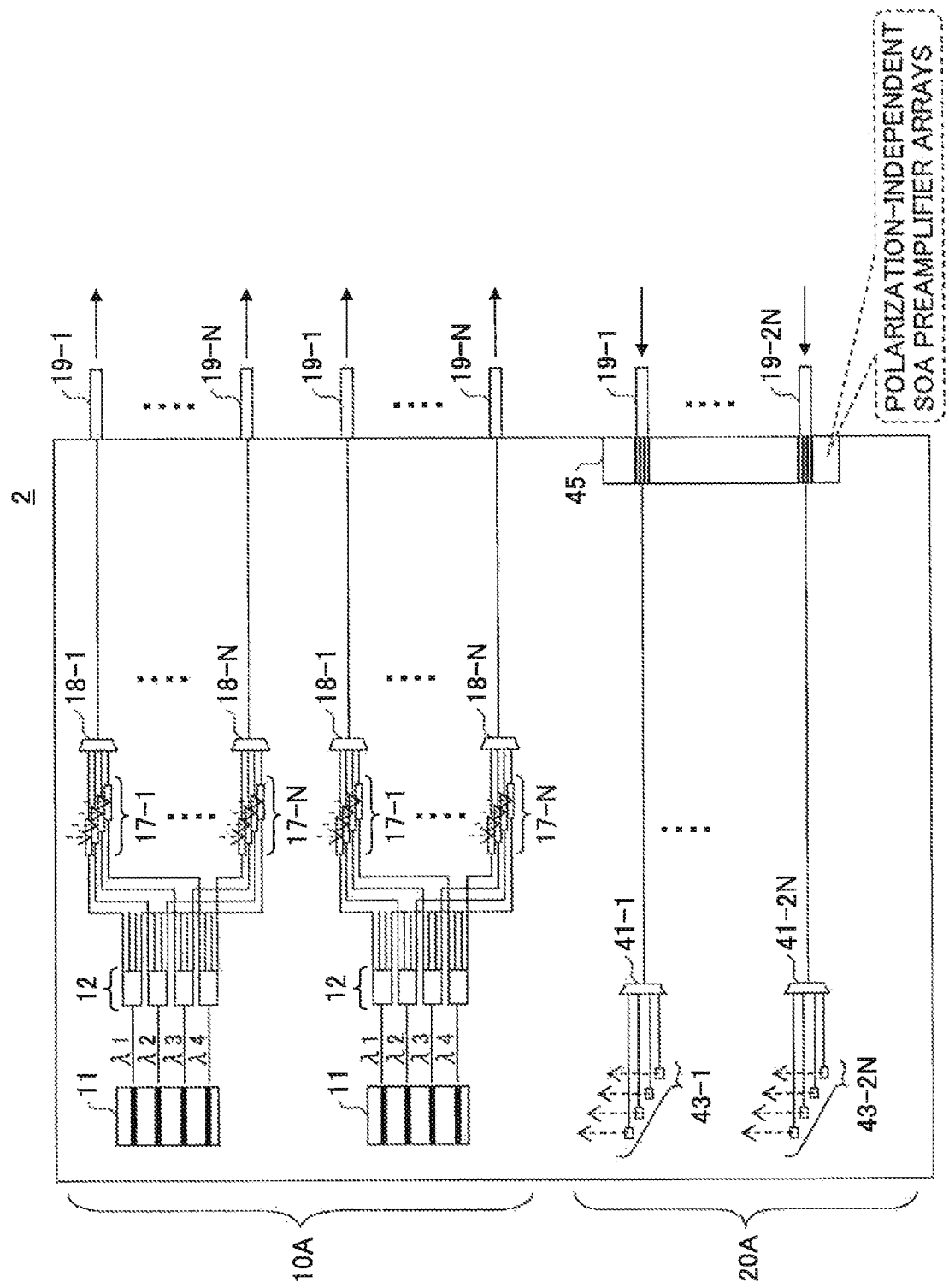
FIG. 5 illustrates a configuration in which a transmission-side integrated optical circuit and a receiving-side integrated optical circuit are formed in the same substrate.

FIG. 5 illustrates an optical transceiver 2 in which the structure of FIG. 3 is realized on a same chip. In general, optical transmission is performed in both directions, and a transmission-side integrated optical circuit and a receiving-side integrated optical circuit are formed on a single chip. The optical transceiver 2 also has a transmission-side integrated, optical circuit 10A and a receiving-side integrated optical circuit 20A on the same substrate. The chip size is, for example, 2 cm×2 cm.

The transmission-side integrated optical circuit 10A has two or more multi-wavelength laser arrays 11. In the example of FIG. 5, two wavelength laser arrays 11 are flip-chip mounted on the substrate. The configuration and the function of the transmission-side integrated optical circuit 10A is the same as those of the transmission-side integrated optical circuit 10 of FIG. 3. Laser light of each wavelength emitted from the multi-wavelength. (e.g., 4-wavelength) laser array 11 is split into N branches by a corresponding one of 1×N photo couplers 12-1 to 12-N, and light components split from the respective wavelengths are distributed in N groups. The light components in each group are lined up in order of wavelength (e.g., in order of λ1, λ2, λ3 and λ4). The light components of the respective wavelengths are modulated by associated data signals and combined by the optical wavelength mulitiplexers (MUX) 18-1 to 18-N. The combined WDM signal lights are transmitted by the optical fibers 19-1 to 19-2N (which may be collectively referred to as "optical fibers 19").

The receiving-side integrated optical circuit 20A has a polarization-independent SOA preamplifier array 45. The polarization-independent SOA preamplifier array 45 is flip-chip mounted on the substrate at an input end of the receiving part. One end of the polarization-independent SOA preamplifier array 45 is optically connected to the optical fibers 19-1 to 19-2N of the receiving part. The other end of the polarization-independent SOA preamplifier 45 is optically connected to DEMUXs 41-1 to 41-2N via silicon photonic waveguides. The outputs of the DEMUXs 41-1 to 41-2N are connected to inputs to photodetector arrays 43-1 to 43-2N. Light components contained in the received signal light are separated according to the wavelengths (λ1, λ2, λ3 and λ4) by the associated DEMUX 41, and converted into electric currents representing data signals by the associated photodetector array 43. By arranging the polarization-independent SOA preamplifier array 45 at the input end of the substrate, coupling loss between the optical fibers 19 and silicon photonic waveguides can be eliminated. By using the polarization-independent SOA preamplifier 45 whose optical gain is independent from polarization state, the WDM signal light with random polarization state is amplified at a constant gain and stable signal reception is realized.

Similar to FIG. 3, optical gain of 6 dB or more can be provided to the received WDM signal by the polarization-independent SOA preamplifier array 45. With this arrangement, the laser output power level of the transmission part can be maintained at or below that of no branch configuration, and simultaneously, satisfactory receive sensitivity is achieved at each link.

Figure 6:
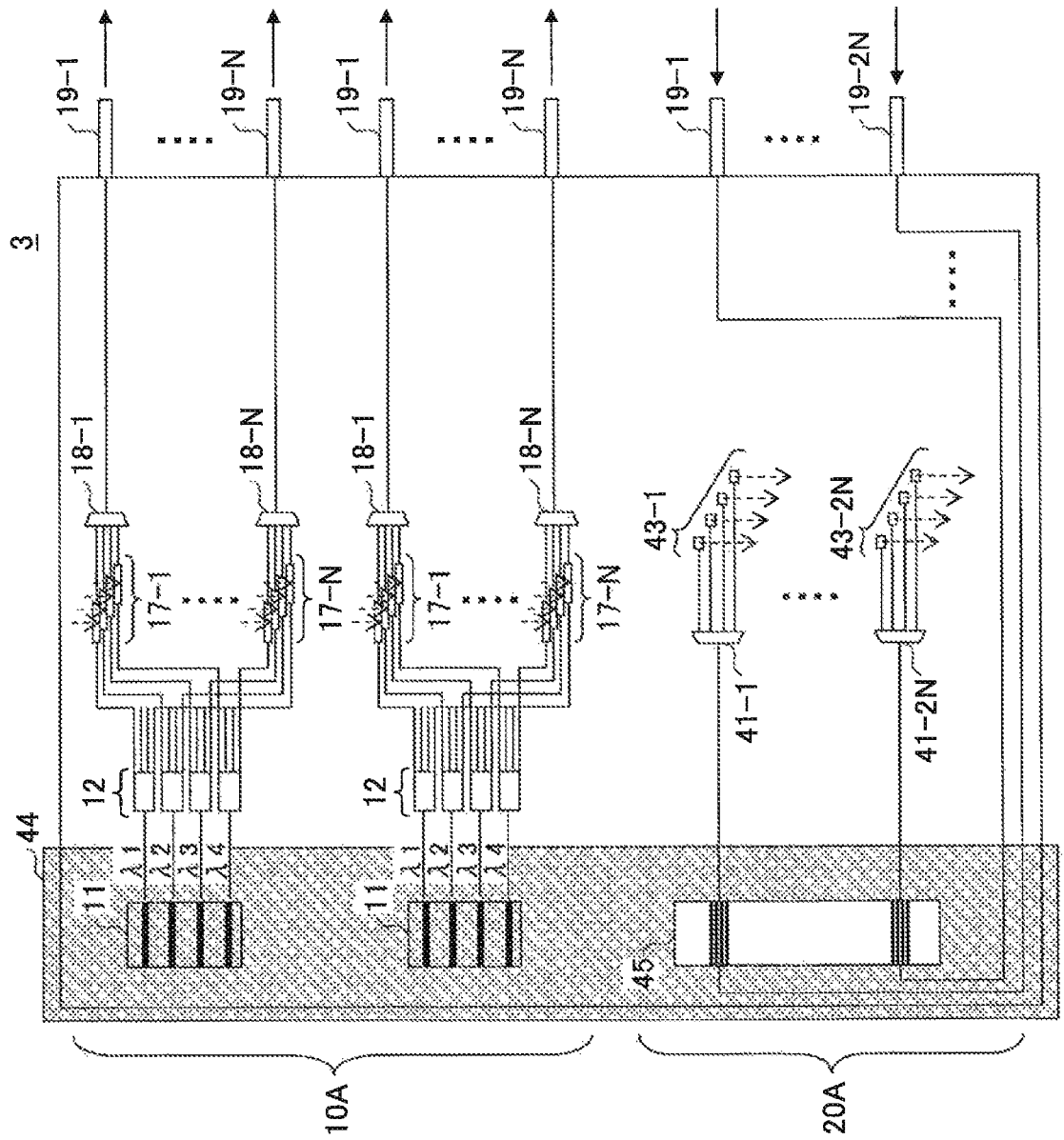
FIG. 6 is a schematic diagram of a modification of the optical transceiver of FIG. 3.

FIG. 6 is a schematic diagram of an optical transceiver 3 as a modified example. In the configuration of FIG. 6, the laser arrays 11 of the transmission-side integrated optical circuit 10A and the polarization-independent SOA preamplifier array 45 of the receiving-side integrated optical circuit 20A are arranged side by side on the same side of the chip. At the opposite end of the chip, arrays of waveguides or optical fibers 19 for output purpose and input purpose are arranged side by side.

In this layout, the mounting positions of the laser arrays 11 and the polarization-independent SOA preamplifier array 45 are separated from the optical fiber mounting position and assembling is facilitated. By placing a heat sink 44 or an arbitrary heat dissipation structure along the laser array 11 and the polarization-independent SOA preamplifier array 45, heat is transferred effectively from the laser arrays 11 and the polarization-independent SOA preamplifier array 45.

Figure 7:
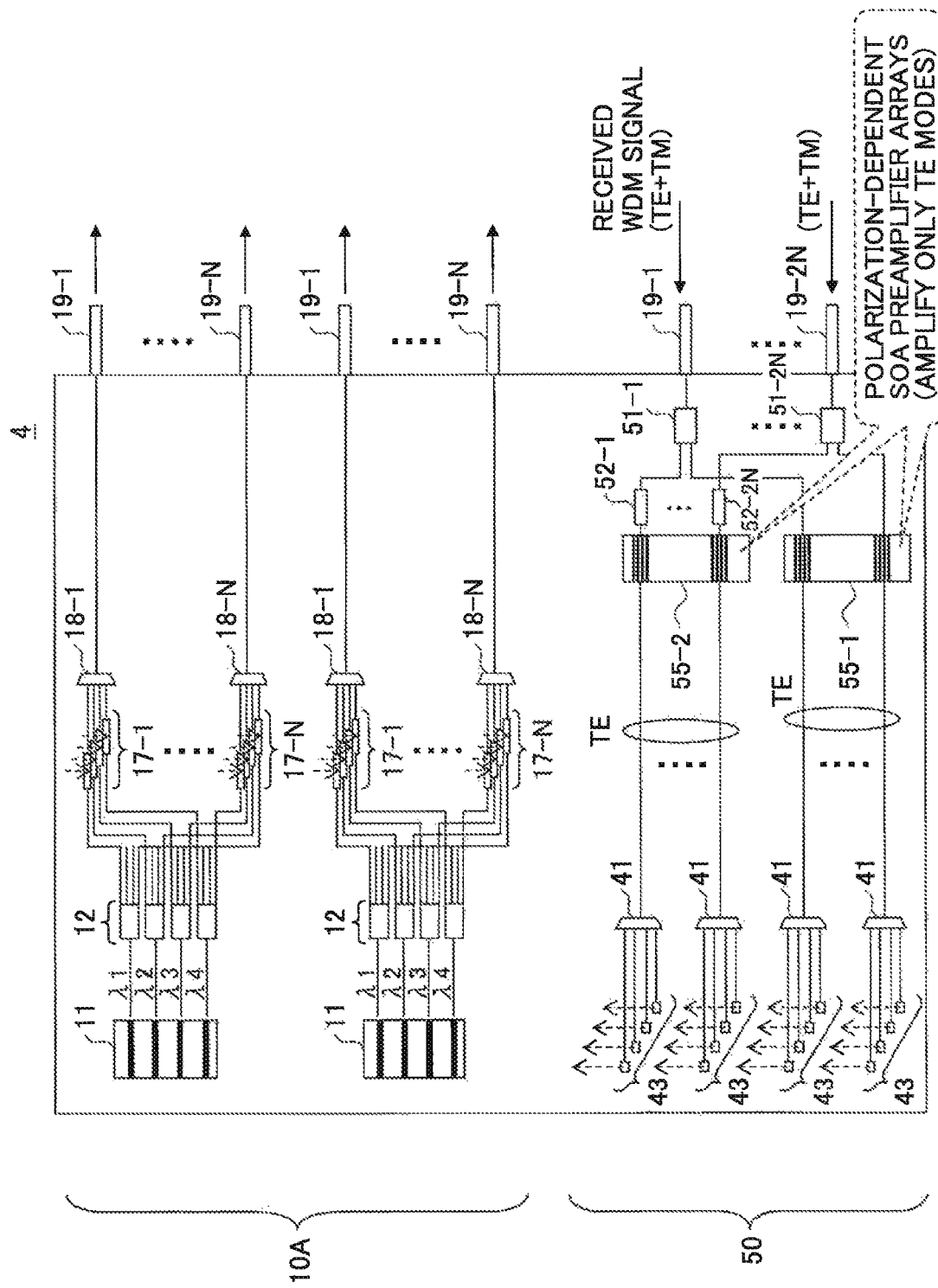
FIG. 7 is a schematic diagram of another modification of the optical transceiver of FIG. 3.

FIG. 7 is a schematic diagram of an optical transceiver 4 as another modification. In the optical transceiver 4, polarization-dependent SOA preamplifier arrays 55-1 and 55-2 are used. The optical transceiver 4 has a transmission-side integrated optical circuit 10A and a receiving-side integrated optical circuit 50. The receiving-side integrated optical circuit 50 has photo couplers (directional couplers) 51-1 to 51-2N (which may be collectively referred to as "photo couplers 51") arranged corresponding to optical fibers 10-1 to 10-2N. Each of the photo couplers 51 has two outputs. One output of the photo coupler 51 is coupled to the first polarization-dependent SOA preamplifier array 55-1, and the other output is coupled to the second polarization-dependent SOA preampilfier array 55-2. Polarization rotators 52-1 to 52-2N are inserted between the second polarization-dependent SOA preamplifier array 55-2 and the photo couplers 51-1 to 51-2N.

Each of the photo couplers 51-1 to 51-2N splits the input light equally into two light components. The received WON signal light incident on the silicon photonic waveguide via a spot size converter (not illustrated) from the associated, optical fiber 19 contains a transverse-electric (TE) polarized component and a transverse-magnetic (TM) polarized component. TE-polarized light has an electric field perpendicular to the direction of propagation and oscillates in a plane parallel to the substrate. TM-polarized light has an electric field perpendicular to the direction of propagation and oscillates in a plane perpendicular to the substrate. The incident light can be equally split for each of the TE-polarized component and the TM-polarized component by setting the cross-sectional dimensions of the core of the silicon photonic waveguide to 500 nm or less (for example, 400 nm width and 200 nm height), and by appropriately adjusting the spacing and the length of coupling parts of each photo coupler 51 and the radius of bending branch.

One waveguide extending from each photo coupler 51 is connected directly to the first polarization-dependent SOA preamplifier array 55-1. The other waveguide extending from each photo coupler 51 is connected to the second polarization-dependent SOA preamplifier array 55-2 via the polarization rotator 52 at which the TM-polarized component is converted to a TE-polarized component and the TE-polarized component is converted to a TM-polarized component. At the first polarization dependent SOA preamplifier array 55-1, the TE-polarized component originally contained in the received WDM signal are selectively amplified. At the second polarization-dependent SOA preamplifier array 55-2, the TM-polarized components originally contained (before rotation) in the received WDM signal are amplified. Consequently, the output signals from both the first and the second polarization-dependent SOA preamplifier arrays 55-1 and 55-2 become TE-polarized signals.

Each amplified TE-polarized light is subjected to wavelength separation at the corresponding DEMUX 41, and electric currents corresponding to data signals are detected by the photodetector array 43. By splitting the received WDM signal for each of the polarization modes and performing wavelength separation and detection at different DEMUXs 41 and photodetector arrays 43, polarization diversity detection is realized. The detected electric currents are converted into voltage signals by transimpedance amplifiers (not illustrated) and demodulated by a digital processing circuit (not illustrated).

Figure 8:
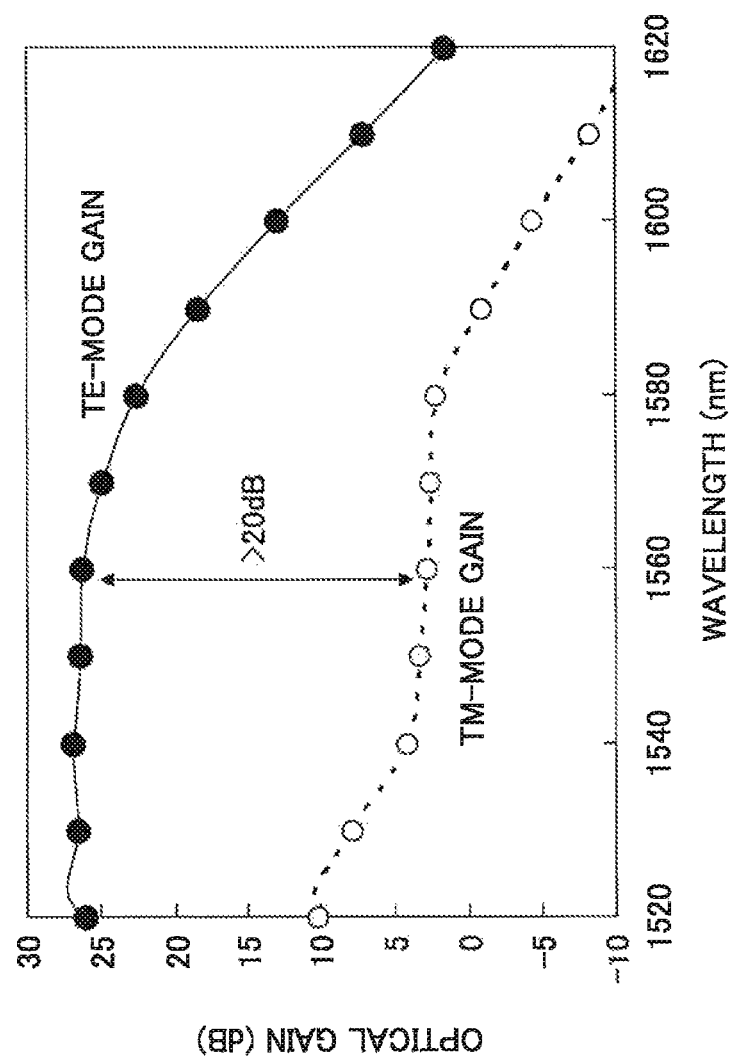
FIG. 8 illustrates a gain spectrum of a polarization-dependent SOA preamplifier.

FIG. 8 illustrates a gain spectrum of the polarization-dependent SOA preamplifier array 55. The polarization-dependent SOA preamplifier arrays 55-1 and 55-2 have a high optical gain with respect to TE-mode polarization. The difference in optical gain between TE-mode polarization and TM-mode polarization is greater than 20 dB. Making use of this characteristic, the polarization-dependent SOA preamplifier arrays 55-1 and 55-2 can be used as polarizers for letting only TE-polarized light component pass through. The TM-polarized component originally contained in the received signal is rotated to a TE-polarized component, and then guided to the polarization-dependent SOA preamplifier array 55-2. Accordingly, devices with a high gain with respect to TE-mode polarization can be used in common for the first and second polarization-dependent SOA preamplifier arrays 55-1 and 55-2. Since it is sufficient for the DEMUX 41 to be operative only for the TE-mode polarization at all the ports, a silicon photonic based wavelength demultiplexer likely to have a large polarization dependency can be applied easily. This is also an advantage.

Figure 9:
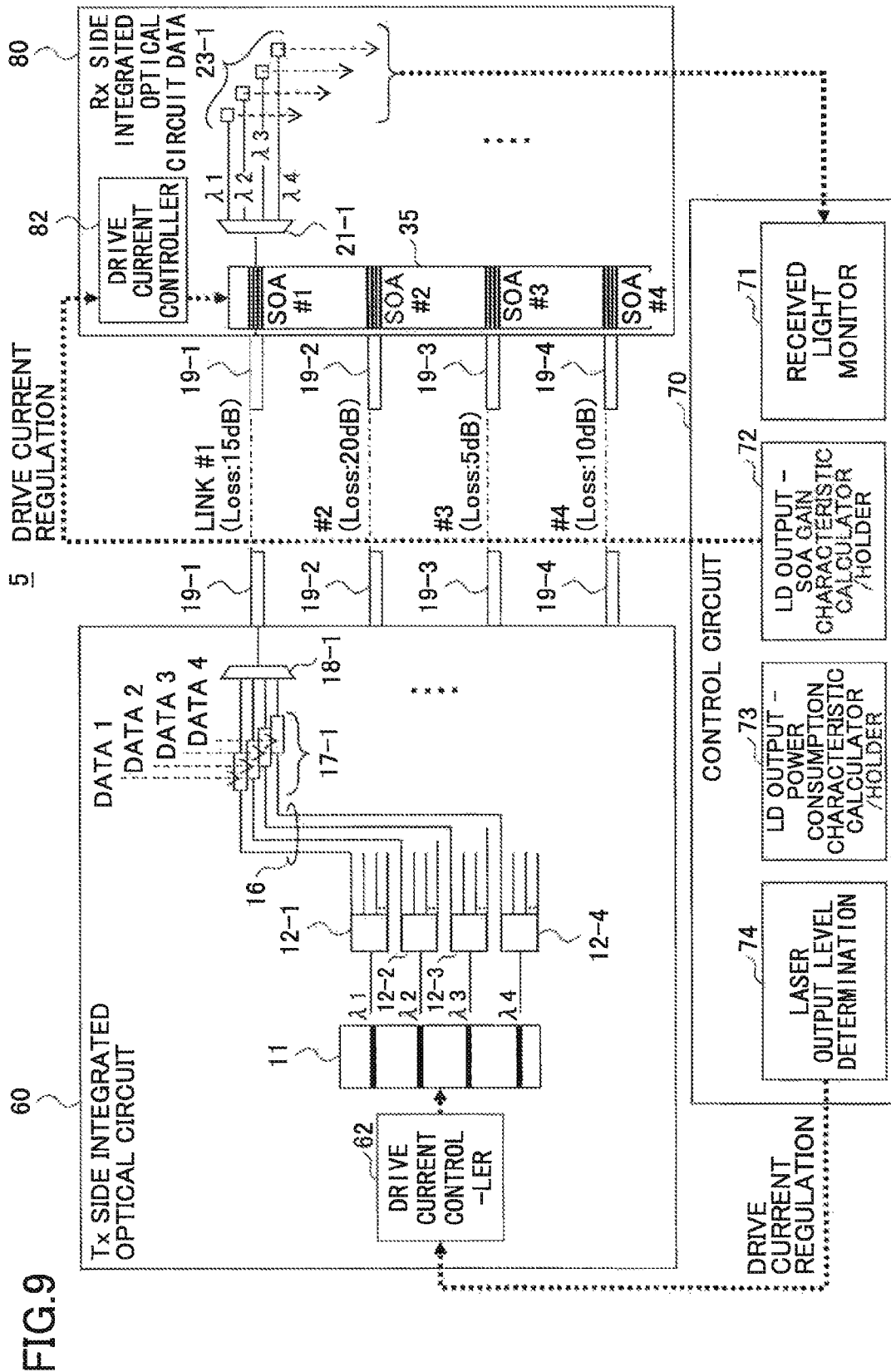
FIG. 9 illustrates an optical output level control mechanism for an optical transceiver according to the second embodiment.

FIG. 9 illustrates a optical output level control mechanism of an optical transceiver 5 according to the second embodiment. The optical transceiver 5 has a transmission-side integrated optical circuit 60, a receiving-side integrated optical circuit 80, and a control circuit 70. The basic structure and function of the transmission-side integrated optical circuit 60 are similar to those of the transmission-side integrated optical circuit 10 of FIG. 3. In this example, the number of branches of output light of each wavelength is 4 for the sake of explanation. The transmission-side integrated optical circuit 60 differs from the structure of FIG. 3 in that it receives a control signal from the control circuit 70 to regulate the output level, of the laser array 11. The transmission-side integrated optical circuit 60 has a drive current controller 62 that regulates a drive current for driving SOA devices (not illustrated) of the laser array 11 in response to the control signal.

The basic structure and function of the receiving-side integrated optical circuit 80 are similar to those of the receiving-side integrated optical circuit 20 of FIG. 3. In this example, the SOA preamplifier array 35 has four SOA devices #1 to #4 corresponding to four links. A distinction from the structure of FIG. 3 is that the intensity of the received light detected by the photodetector array 23 of each link is supplied, to the control circuit 70 and the optical gain of each SOA device of the SOA preamplifier array 35 is adjusted based upon the control, signal from the control circuit 70. The receiving-side integrated optical circuit 80 has a drive current controller 82 that regulates a drive current for driving the SOA devices #1 to #4 in response to the control signal. The gain of the each SOA devices can be adjusted separately by changing the drive current.

The control circuit 70 has a received light monitor 71, a LD output vs. SOA gain characteristic calculator and holder 72, a LD output vs. power consumption characteristic calculator and holder 73, and a laser output level determination unit 74. The control circuit 70 may be formed on the same substrate as the receiving-side integrated optical circuit 80, or alternatively, it may be provided separately from the optical transceiver silicon chip.

The links #1 through #4 have different propagation losses. The received light monitor 71 of the control circuit 70 acquires an optical loss of each link based upon the detection result of the intensity of the received signal supplied from the receiving-side integrated optical circuit 80.

Figure 10A:
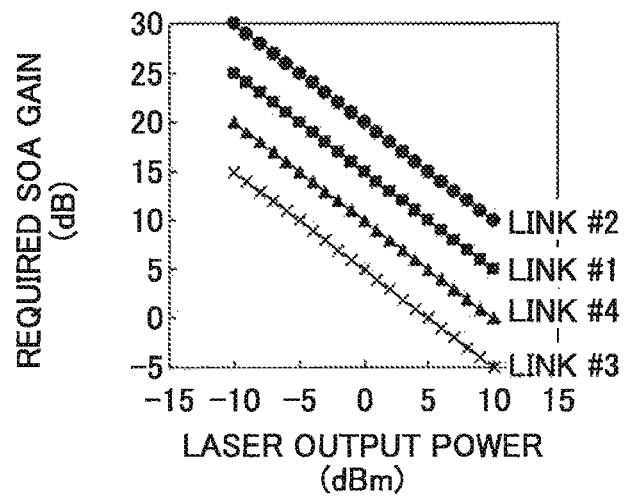
FIG. 10A illustrates an example of data items calculated by and held in a control circuit of the optical transceiver.

The LD output vs. SOA gain characteristic calculator and holder 72 calculates and holds SOA gain required for achieving the minimum receive sensitivity at all, the wavelengths for each of the SOA devices, as a function of the laser output power level, based upon the link losses of the respective links. FIG. 10A illustrates an example of the calculation result at the LD output vs. SOA gain characteristic calculator and holder 72. For each of the links #1 through #4, the SOA gain needed for the receiving side is plotted as a function of the laser output power level. Because, in the example of FIG. 9, the optical loss of link #2 is the greatest, the SOA gain required is also the greatest. In contrast, link #3 at which the optical loss is small requires small SOA gain even though the laser output power level is the same. The optical gains (SOA gains) required for the respective SOA devices are supplied to the drive current controller 82 of the receiving-side integrated optical circuit 80.

The LD output vs. power consumption characteristic calculator and holder 73 of the control circuit 70 calculates and holds power consumptions of the laser array 11 and the SOA preamplifier array 35 as a function of laser output power level.

Figure 10B:
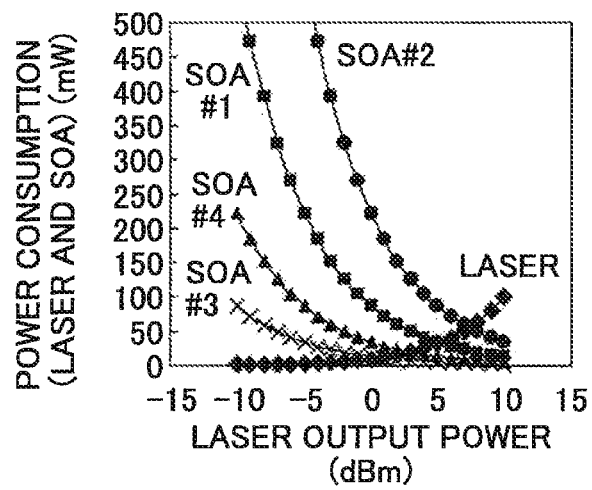
FIG. 10B illustrates an example of data items calculated by and held in a control circuit of the optical transceiver.

FIG. 10B illustrates an example of the calculation result at the LD output vs. power consumption characteristic calculator and holder 73. The power consumption, of the laser array 11 increases as the laser output power level increases. On the other hand, the power consumption of the receiving-side SOA devices #1 through #4 decreases as the laser output power level increases. The power consumption of the receiving-side. SOA devices #1 through #4 is subjected to the influence of link losses. The power consumption of SOA device #2 with greater propagation loss is greater than that of the SOA device #3 with less propagation loss.

Figure 10C:
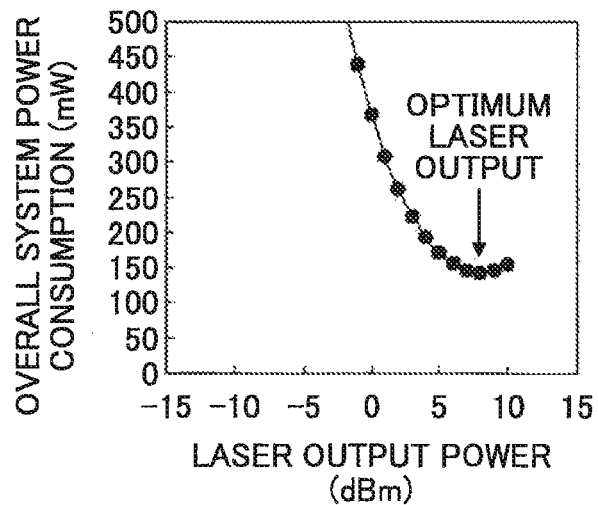
FIG. 10C illustrates an example of data items calculated by and held in a control circuit of the optical transceiver.

The total power consumption of the system is a sum of the power consumption of the laser array 11 and the power consumptions of all the receiving-side SOA devices #1 through #4. FIG. 10C illustrates a summation of all the calculation results plotted in FIG. 10B. The laser output level determination unit 74 selects a laser output power level at which the total power consumption of the entirety of the system becomes the minimum as the optimum laser output power. The selected (determined) laser output power level is supplied as a control signal to the drive current controller 62 of the transmission-side integrated optical circuit 60.

With this arrangement, the optimum laser output power level that minimizes the total power consumption of the overall, system can be selected.

At the receiving side, the SOA devices are controlled so as to provide the minimum optical gain required to guarantee the receive sensitivity.

Figure 11:
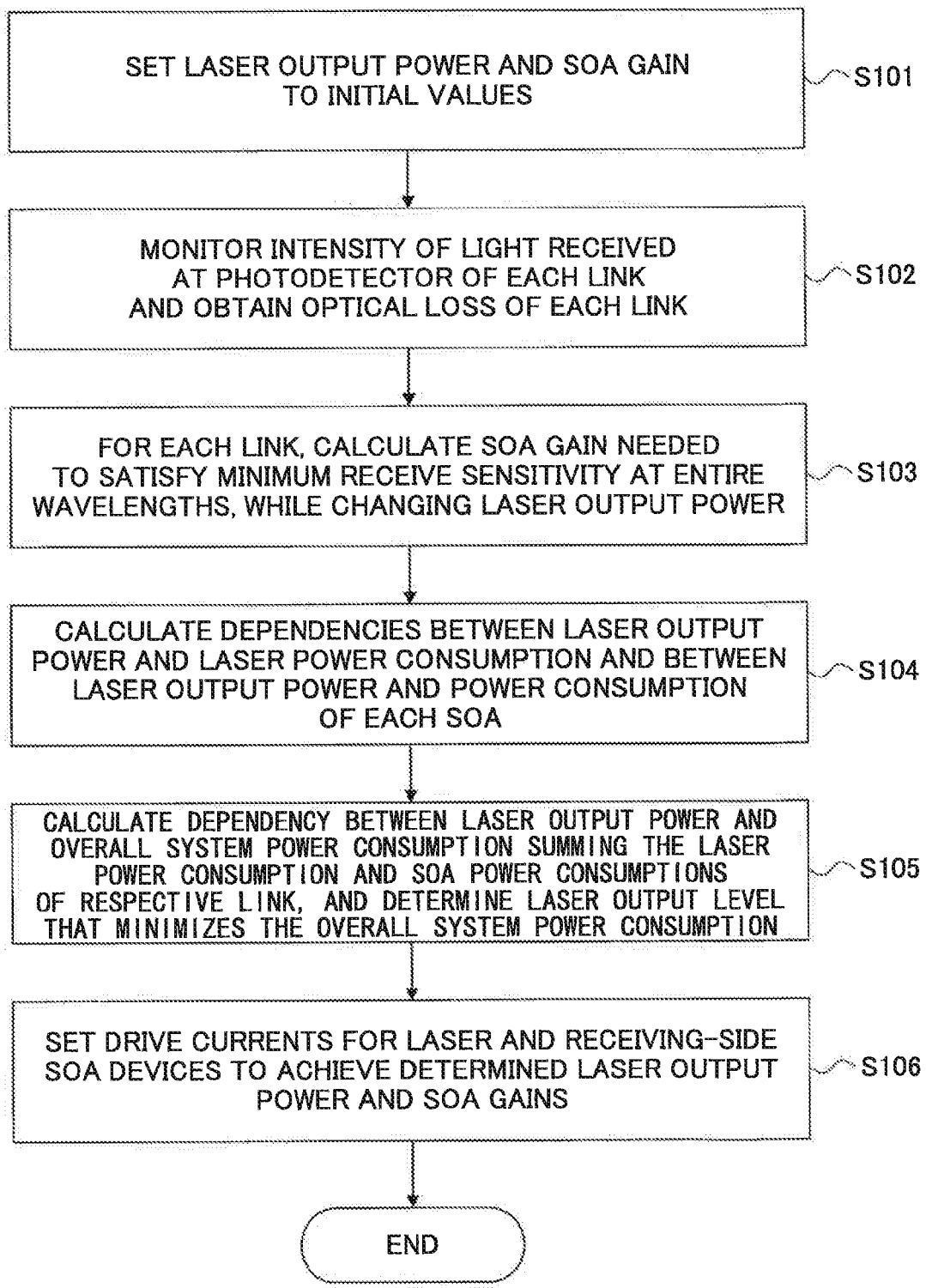
FIG. 11 is a diagram illustrating a control flow executed by the control circuit of the optical transceiver.

FIG. 11 is a flowchart of a control operation performed by the control circuit 70. In step S101, the output power level of the laser array 11 and the optical gains of the SOA devices #1 through #4 of the SOA preamplifier array 35 are set to initial values. For linkup, the control circuit 70 provides initial, electric currents to the drive current control circuit 62 for the laser array 11 and the drive current control circuit. 82 for the SOA preamplifier array 35.

In step S102, intensities of the signal lights received at the respective photo detector arrays 23 of the links are monitored, and optical losses of the respective links are acquired from the output power level of the laser array 11 and the optical gains of the SOA preamplifier array 35 at the given initial drive currents.

In step S103, while changing the laser output power, optical gains of the SOA devices required to achieve the minimum receive sensitivity at all, the wavelengths (e.g., λ1 to λ4) are calculated based upon the optical losses of the respective links.

In step S104, power consumption of the laser array 11 and the SOA devices #1 through #4 that varies depending on laser output power is calculated, and the calculation results are stored (see FIG. 10B).

In step S105, the power consumption of the laser array 11 and the power consumptions of the SOA devices #1 through #4 are added to obtain the total power consumption of the system as a function of the laser output power. Then, a laser output power level that minimizes the total power consumption is selected as an updated laser output power level from the calculation result (see FIG. 10C).

In step S106, a drive current to provide the laser output power determined at S105 is set for the laser array 11 and drive currents to provide the SOA cams determined at S103 are set for the SOA devices #1 through #4. For example, a control signal representing a drive current to provide the updated laser output power is generated and supplied to the drive current controller 62. Similarly, control signals representing drive currents to provide the updated SOA optical gain are generated and supplied to the drive current controller 82.

As illustrated in FIG. 10A to FIG. 10C, the laser output power and the SOA gains that minimize the total power consumption of the system vary depending on the optical losses of the respective links. By adopting the control scheme of FIG. 11, the total power consumption of the system can be always minimized even if the optical losses change in the links. Even with the configuration of FIG. 9 in which light from a single laser source is branched by a photo coupler 12 into two or more links, the laser output and the optical gains of the SOA devices can be appropriately determined so as to minimize the total power consumption of the entire links. With a configuration of FIG. 5 in which two or more laser arrays 11 are provided (or alternatively two or more SOA preamplifier arrays 35 may be provided), the control flow of FIG. 11 may be performed for each array to minimize the power consumption of the overall system.

The present invention is not limited to the above-described embodiments, rather, each of the embodiments and modifications may be combined arbitrarily with each other. For example, the configuration of FIG. 7 may be further modified such that the polarization-dependent SOA-preamplifier arrays 55-1 and 55-2 may be positioned on the same side as the laser array 11. Alternatively, a heat sink 44 may be added to FIG. 7 as in FIG. 6, or the polarization diversity structure of FIG. 7 may be applied to the receiving-side integrated optical circuit 80 of FIG. 9. In any case, the power consumption of the overall system can be reduced in wavelength division multiplexing transmission.

The structures and the techniques of the embodiments can be applied to optical transmission systems used in data centers, supercomputers or high-end servers.

All examples and conditional language provided herein are intended for the pedagogical purpose of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. An optical transmission system comprising:
   a transmission-side integrated optical circuit to output a wavelength division multiplexed signal with light components of different wavelengths combined therein to an N-link transmission path;
   a receiving-side integrated optical circuit to receive the wavelength division multiplexed signal from the transmission path, and
   a control circuit connected to the transmission-side integrated optical circuit and the receiving-side integrated optical circuit,
   wherein the transmission-side integrated optical circuit has a multi-wavelength light source, a photo coupler to split light of each wavelength output from the multi-wavelength light source into N branches, an optical modulator to modulate a group of light components split from the respective wavelengths by different data signals, and an optical wavelength multiplexer to multiplex the modulated light components of the different wavelengths into the wavelength division multiplexed signal, and
   wherein the receiving-side integrated optical circuit has
      an optical wavelength demultiplexer to separate signal light components of the different wavelengths from the received wavelength division multiplexed signal,
      a set of N optical amplifiers inserted between the transmission path and the optical wavelength demultiplexer, each optical amplifier being configured to collectively amplify the signal light components of the different wavelengths contained in the wavelength division multiplexed signal received from a corresponding link of the transmission path, and
      a set of photo detectors arranged after the optical wavelength demultiplexer and to detect the signal light components of the different wavelengths,
   wherein the control circuit controls an output power level of the multi-wavelength light source and gains of the N optical amplifiers, based upon intensities of the signal light components detected by the photo detectors, and
   wherein the control circuit has
   a received light monitor to monitor the intensities of the signal light components detected by the photo detectors and determine optical losses of the respective links of the transmission path;
   a first calculation part to calculate and store the gains for the N optical amplifiers as a function of the output power level of the multi-wavelength light source, based upon the optical losses of the respective links;
   a second calculation part to calculate and store power consumption amounts of the multi-wavelength light source and power consumption amounts of the N optical amplifiers as a function of the output power level of the multi-wavelength light source, based upon the output power level of the multi-wavelength light source and the gains for the N optical amplifiers; and
   a determination part to determine a new output power level of the multi-wavelength light source based upon a total power consumption summing up the power consumption of the multi-wavelength light source and the power consumption of the N optical amplifiers.

2. The optical transmission system according to claim 1, wherein the determination part selects an output power level that minimizes the total power consumption as the new output power level of the multi-wavelength light source.

3. The optical transmission system according to claim 1, wherein the transmission-side integrated optical circuit further has a first drive current controller to control an electric current applied to the multi-wavelength light source, and
   wherein the receiving-side integrated optical circuit further has a second drive current controller to control electric currents applied to the N optical amplifiers, and the output power level determined by the determination part is supplied to the first drive current controller and the gains calculated by the first calculation part are supplied to the second drive current controller.

4. A method for controlling an optical output level of a multi-wavelength light source used in a wavelength division multiplexing transmission system, comprising:

receiving from an optical link a wavelength division multiplexed signal in which signal lights with different wavelengths are multiplexed;

amplifying the wavelength division multiplexed signal using an optical amplifier before wavelength separation is performed;

detecting an intensity of a separated signal light of each wavelength;

calculating an optical loss of the optical link based upon the intensity;

calculating and holding an optical gain of the optical amplifier as a function of an output power level of the multi-wavelength light source based upon the optical loss of the optical link;

calculating and holding a first power consumption amount of the multi-wavelength light source and a second power consumption amount of the optical amplifier as a function of the output power level of the multi-wavelength light source based upon the output power level of the multi-wavelength light source and the optical gain of the optical amplifier; and determining a new output power level of the multi-wavelength light source based upon a total power consumption of the first power consumption and the second power consumption.

5. The method according to claim 4, wherein the new output power level of the multi-wavelength light source is determined so as to minimize the total power consumption.

6. The method according to claim 5, wherein a new optical gain for the optical amplifier is determined based upon the new output power level and the optical loss of the optical link.

* * * * *